| United States Patent [19] | [11] | 4,319,728 |
|---|---|---|
| Pataki et al. | [45] | Mar. 16, 1982 |

[54] LIQUIFIED GAS CYLINDER ANTI-ROTATION DEVICE

[75] Inventors: William V. Pataki; O. Raymond Smay, both of Newburgh, Ind.

[73] Assignee: Aluminum Company of America, Pittsburgh, Pa.

[21] Appl. No.: 140,018

[22] Filed: Apr. 14, 1980

[51] Int. Cl.³ ............................................. A47G 23/02
[52] U.S. Cl. ..................................... 248/154; 248/671
[58] Field of Search ................... 220/69; 248/146, 152, 248/154, 671, 672, 312, 499; 206/446; 410/47; 211/13, 71

[56] References Cited

U.S. PATENT DOCUMENTS

| 1,977,725 | 10/1934 | Heidbrink | 248/154 |
| 2,092,165 | 9/1937 | Kepler | 248/146 |
| 2,805,033 | 9/1957 | Rous | 206/446 X |
| 2,915,799 | 12/1959 | Andreasen | 24/270 |

Primary Examiner—Ramon S. Britts
Assistant Examiner—R. Ramirez
Attorney, Agent, or Firm—Max L. Williamson

[57] ABSTRACT

An anti-rotation device having a bracket adapted for attachment to a platform and a blade projecting generally upward from the bracket for a wedge-like engagement in an opening in the neck of a cylindrical fuel tank to prevent rotation of the tank about its longitudinal axis and limit the longitudinal movement of the tank when attached to the platform.

3 Claims, 5 Drawing Figures

LIQUIFIED GAS CYLINDER ANTI-ROTATION DEVICE

BACKGROUND OF THE INVENTION

This invention relates to a device to fix the position of a cylindrical tank. More particularly, this invention prevents rotation of a cylindrical liquified gas fuel tank about its longitudinal axis and limits longitudinal movement of the tank when the tank is attached to a platform as on an industrial type vehicle, for example.

Industrial type vehicles, such as fork-lift trucks, commonly use a flammable gas such as propane, butane or the like as fuel. The fuel is provided for use in a liquid form under pressure in a cylindrical metal tank and the tank is rigidly mounted to the vehicle.

A portion of the fuel is in a liquid state and another portion in a gaseous state within the cylinder. A manually operated valve is provided on one end of the cylinder to permit transfer of the liquid portion of the fuel from the cylinder to the motor through a hose coupled to the valve. The fuel system is designed to operate at a maximum fuel pressure and to guard against developing an excessive pressure, a pressure relief valve near the fuel transfer valve is provided in the cylinder end.

The fuel cylinder is commonly attached to the vehicle with its longitudinal axis horizontal. When attached in this manner, it is important that the pressure relief valve be oriented in a position that it is exposed internally to the gaseous portion of the cylinder since exposure to the liquid portion will impair the proper functioning of the valve.

Andreasen, U.S. Pat. No. 2,915,799, shows a clamping unit in common usage for horizontal attachment of a liquified gas cylinder to a vehicle. To insure that the pressure relief valve is properly positioned in relation to the gaseous portion of the tank, a pin located outward from one of the clamping units projects upward and is inserted through a hole provided in a sleeve or neck ring portion of the tank which surrounds the fuel transfer valve. The hole in the sleeve is large enough to permit free entry of the pin therein but restricts any appreciable rotation of the cylinder about its longitudinal axis. The pin is disposed in relation to the pressure relief valve so that after engagement with the pin, the valve is exposed to the gaseous portion of the tank. Thus, if the pin is properly engaged in the hole in the sleeve prior to securing the tank to the vehicle with the clamping units, the tank is restrained from rotation and the pressure relief valve is maintained in the proper relationship with the gaseous portion of the tank to insure its proper functioning.

The disadvantage of an anti-rotation device of this kind is that the relatively small diameter pin is fragile in an industrial environment and can be easily bent or broken making it possible to install a fuel cylinder in a manner that the pressure relief valve could be inoperative. It would be desirable, therefore, to provide an anti-rotation device for use with horizontally mounted liquified gas tanks which would insure that a tank is secured in place so that the pressure relief valve is properly oriented and that the tank is rigidly restrained from rotating about its longitudinal axis.

SUMMARY OF THE INVENTION

This invention provides a device for rigidly restraining a liquified gas cylindrical fuel tank from rotation about its longitudinal axis and for limiting longitudinal movement of the tank when it is attached to a platform on a vehicle. The invention comprises a support bracket and a truncated triangular shaped blade member attached thereto. The bracket is adapted for attachment to a platform on a vehicle and has a concave portion upon which the neck ring of a fuel tank rests. The blade member which is attached to the bracket has a portion projecting generally upward from the concave portion of the bracket. When the tank is mounted on the vehicle, the blade member engages the neck ring by projecting in a wedge-like manner through an opening provided in the neck ring. Thus engaged, the tank cannot rotate and is also limited in movement in a longitudinal direction.

It is an object of this invention to provide a device for attachment to a vehicle which will insure the proper positioning of a liquified gas tank when attaching the tank to the vehicle.

It is also an object of this invention to provide apparatus for positioning a tank which is durable and not susceptible to deformation in an industrial environment.

It is also an object of this invention to provide apparatus which will restrain rotational and longitudinal movement of the tank after the tank is attached to the vehicle.

These and other objects of the invention will be more fully understood and appreciated with reference to the following description and the drawings attached hereto.

DETAILED DESCRIPTION OF THE PREFERRED EMBODIMENTS

Figure 1:
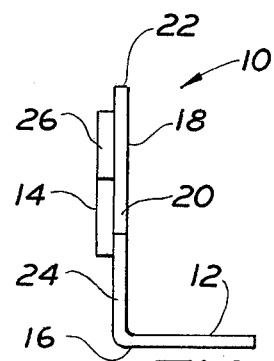
FIG. 1 is an end elevation view of a device of this invention showing the bracket and the blade member attached thereto.
Figure 2:
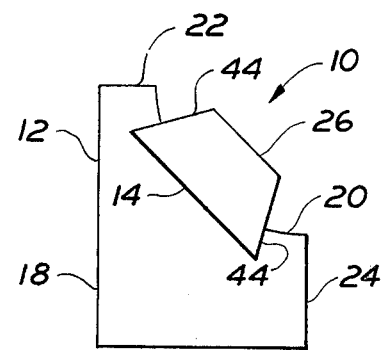
FIG. 2 is a side elevation drawing of the device shown in FIG. 1.

Referring to FIGS. 1 and 2, a device of this invention 10 comprises a bracket member 12 and a blade member 14 on the bracket. The bracket member 12 has a rectangular first plate portion 16 adapted for attachment to a platform, as will be explained later, and a second plate portion 18 projecting upward from the first plate portion 16. The second plate portion 18 of the bracket 12 has a concave edge 20 connecting a top edge 22 and a side edge 24.

The blade member 14 is preferably a trapezoid or truncated triangular shaped plate attached, preferably by welding, to a face of the second plate portion 18 of the bracket 12. The blade 14 is disposed in relation to the second plate portion 18 of the bracket 12 so that the truncated edge 26 projects generally upward from the concave edge 20 of the second plate portion 18 of the bracket 12, and thus the blade 14 may engage a portion of a fuel tank, as will be explained later. To guard against deformation from use or abuse in an industrial environment, both the bracket 12 and the blade 14 are preferably made of steel plate having a substantial thickness, such as ⅜ inch, for example.

Figure 3:
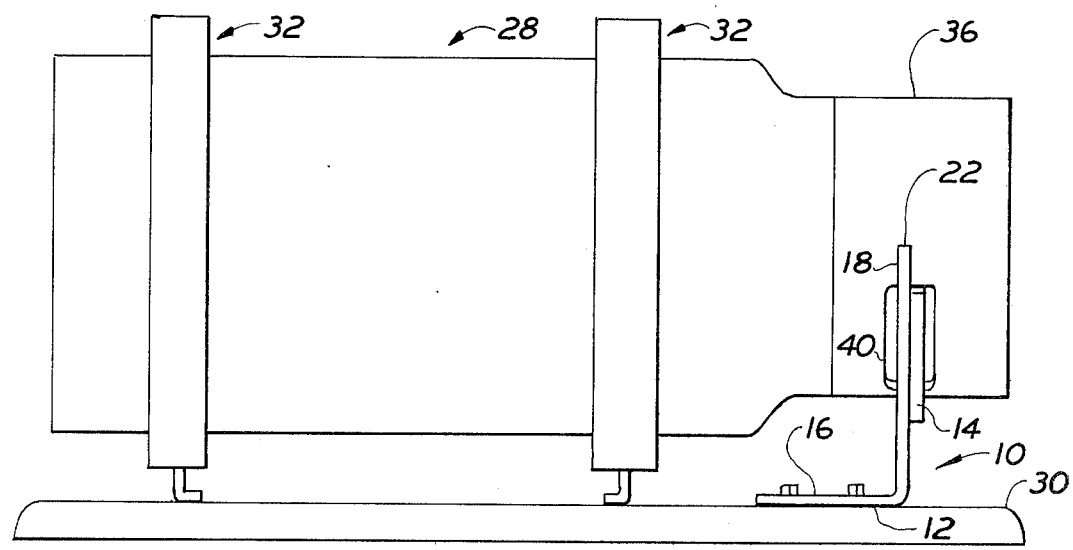
FIG. 3 is a side elevational view of a fuel tank secured horizontally to a vehicle platform and in engagement with the anti-rotation device of this invention through the neck ring of the tank.
Figure 4:
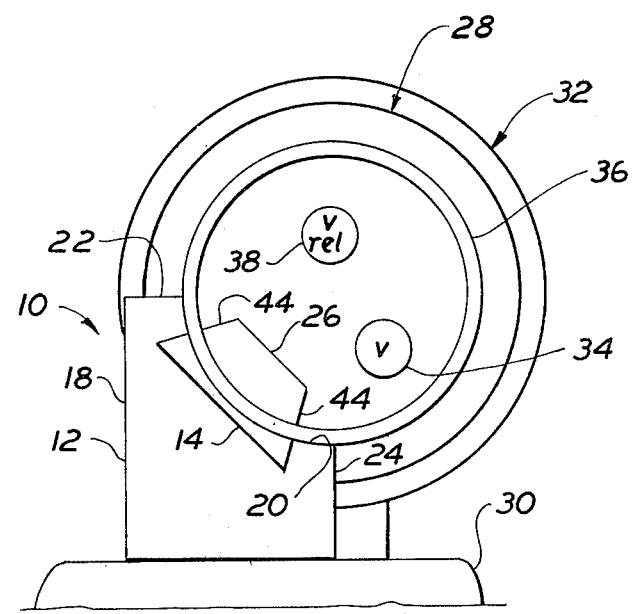
FIG. 4 is an end view of the tank and anti-rotation device assembly shown in FIG. 3.

Referring now to FIGS. 3 and 4, a cylindrical fuel tank 28 is shown rigidly held in position in relation to a vehicle platform 30 by support clamps 32 which are attached to the vehicle platform 30 and surround the tank 28. Projecting outward from the tank 28 on one end is a transfer valve 34 which is equipped with a fitting (not shown) for the purpose of attaching a hose which is connected to the motor of the vehicle. A neck ring 36 also projects outward from an end of the tank partially enclosing the transfer valve 34 and thus protects the valve 34 from damage that may otherwise occur in an industrial environment.

A pressure relief valve 38 is also provided in the end of the tank 28 having the transfer valve 34 in order that any internal pressure within the tank 28 in excess of the design limit of the system may be vented and thus avoid the danger of explosion. To assure proper operation of the pressure relief valve 38, it is important that it be exposed to the gaseous portion of the tank 28, as has been previously explained. The preferred disposition of the pressure relief valve 38 is as shown in FIG. 4; that is, with the tank 28 attached to the platform 30, the center of the pressure relief valve 38 lies on a vertical line extending upward from the platform 30.

To facilitate locking a tank 28 on a vehicle in the above-described disposition of the pressure relief valve 38, a device of this invention 10 is provided to engage the neck ring 36 of the tank 28, as will now be explained.

A device of this invention 10 is attached outward of support clamp 32, preferably with mechanical fasteners through the first plate portion 16 of the bracket 12 to the vehicle platform 30. The attachment may be rigid or may be adjustable, if preferred, by providing slotted holes in the first plate portion 16. It is also apparent that the bracket 12 could be made a part of and incorporated into the support clamp 32.

Figure 5:
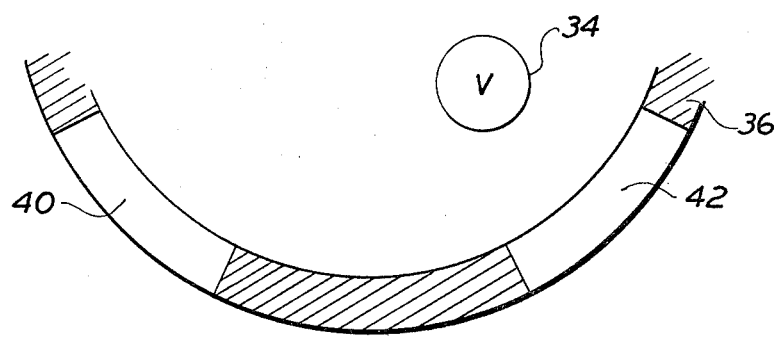
FIG. 5 is a cross section through a portion of the neck ring and hand holds of the tank shown in FIGS. 3 and 4.

Convenient hand holds are provided through the neck ring 36 of most fuel tanks 28 for the purposes of manually handling the tank 28, and for gaining access to the transfer valve 34 when coupling the fuel hose to the transfer valve 34. Two generally rectangular openings 40 and 42, approximately 2 inches by 5 inches, are conventionally provided in the neck ring 36, as shown in FIG. 5, which is a section through a portion of the neck ring 36 and openings 40 and 42. Opening 42 is located proximate the transfer valve 34 and the center of opening 40 is radially disposed approximately 90° away from the center of opening 42 in a clockwise direction away from the transfer valve 34.

It may be seen by referring to FIGS. 3 and 4 that when the tank 28 is positioned to insure proper operation of the pressure relief valve 38, a portion of the blade 14 extends through opening 40. The blade 14 tapers inwardly towards its free edge 26 to aid in guiding the opening 40 over the blade 14 when lowering the tank 28 into position for attachment to the vehicle platform 30. The span of the blade 14 adjacent the concave edge 20 of the second plate portion 18 of the bracket 12 is approximately the same as the length of the opening 40 in the neck ring 36, for a wedge-like fit in the opening 40 to prevent rotation of the tank 28 about its longitudinal axis. Further, the tank 28 is limited to movement in a longitudinal direction when engaged with blade 14, as just described, by the space available between the faces of blade 14 and proximate sides of opening 40.

From FIG. 4, it may also be seen that the concave edge 20 of the second plate portion 18 of the bracket 12 has a radius approximately equal to the outside radius of the neck ring 36 so as to provide additional support at the neck ring 36 for the tank 28 when it is attached to the vehicle platform 30.

It is possible, but highly unlikely, that engagement of the tank 28 with the blade 14 through the wrong opening 42 could be made since two identically sized openings 40 and 42 are conventionally provided in each tank 28. However, the close proximity of the transfer valve 34 to opening 42 would be a signal to the installer of the tank 28 that an error had been made if engagement was made with the blade 14 through the opening 42. Further, if the blade 14 was positioned through the opening 42, access to the fitting on the transfer valve 34 would be so restricted as to make connection with the fuel hose extremely difficult if not impossible.

From FIG. 4, it may also be seen that the concave edge 20 of the second plate portion 18 of the bracket 12 has a radius approximately equal to the outside radius of the neck ring 36 so as to provide additional support at the neck ring 36 for the tank 28 when it is attached to the vehicle platform 30.

Although the invention has been described in relation to its use on a vehicle, it is obvious that its use would be advantageous in other situations where rotational restraint of a gas cylinder is important. Further, it is apparent that modifications and variations of this invention, as hereinbefore set forth, may be made without departing from the spirit thereof, and the invention is not intended to be limited to the embodiment described herein.

What is claimed is:

1. In combination with clamping means for attaching a cylindrical fuel tank having a neck ring on it with a rectangular opening therein to a platform on a vehicle, a device for preventing rotation of the tank about its longitudinal axis and limiting longitudinal movement of said tank, comprising:

a bracket having a first plate portion adapted for attachment to said platform and a second plate portion projecting upward from said first plate portion and having a generally upwardly facing concave edge thereon for supporting the neck ring on said tank; and a flat blade attached to the second plate portion of said bracket and projecting generally upwardly from said concave edge, said blade diverging toward said concave edge for wedging of the blade in the opening in the neck ring of the fuel tank as supported on the concave edge of said second plate portion.

2. A device as set forth in claim 1 in which the span width of said plate at the concave edge on said second plate is approximately equal to the circumferential extent of the opening in the neck ring of the fuel tank to be attached to a vehicle by said device.

3. A device as set forth in claim 1 in which said blade has a trapezoidal shape.

* * * * *